United States Patent
Smith (10) Patent No.: US 10,509,121 B2
(45) Date of Patent: Dec. 17, 2019

(54) DYNAMIC RANGE SETTING FOR VEHICULAR RADARS

(71) Applicant: UATC, LLC, San Francisco, CA (US)

(72) Inventor: Warren Smith, Pittsburgh, PA (US)

(73) Assignee: UATC, LLC, San Franciso, CA (US)

( * ) Notice: Subject to any disclaimer, the term of this patent is extended or adjusted under 35 U.S.C. 154(b) by 298 days.

(21) Appl. No.: 15/451,206

(22) Filed: Mar. 6, 2017

(65) Prior Publication Data

US 2017/0254880 A1 Sep. 7, 2017

Related U.S. Application Data

(60) Provisional application No. 62/304,131, filed on Mar. 4, 2016.

(51) Int. Cl.
| | | |
|---|---|---|
| *G01S 13/93* | (2006.01) | |
| *G01S 13/86* | (2006.01) | |
| *G01S 13/87* | (2006.01) | |
| *G01S 7/40* | (2006.01) | |

(52) U.S. Cl.
CPC .......... *G01S 13/931* (2013.01); *G01S 13/86* (2013.01); *G01S 13/87* (2013.01); *G01S 2007/4013* (2013.01); *G01S 2013/9353* (2013.01); *G01S 2013/9357* (2013.01); *G01S 2013/9375* (2013.01); *G01S 2013/9378* (2013.01); *G01S 2013/9385* (2013.01)

(58) Field of Classification Search
CPC .................................................. G01S 13/931
See application file for complete search history.

(56) References Cited

U.S. PATENT DOCUMENTS

| | | | | |
|---|---|---|---|---|
| 5,717,399 | A * | 2/1998 | Urabe | G01S 13/931 342/70 |
| 6,215,438 | B1 * | 4/2001 | Oswald | G01S 13/931 342/104 |
| 7,400,290 | B2 * | 7/2008 | Woodington | G01S 7/414 342/107 |
| 9,733,348 | B2 * | 8/2017 | Gazit | G01S 13/02 |
| 2004/0150550 | A1 * | 8/2004 | Shouno | G01S 7/35 342/70 |
| 2004/0254729 | A1 * | 12/2004 | Browne | B60R 21/013 701/301 |
| 2006/0109095 | A1 * | 5/2006 | Takata | G01S 13/931 340/436 |
| 2007/0222662 | A1 * | 9/2007 | Toennesen | G01S 13/48 342/27 |
| 2010/0277359 | A1 * | 11/2010 | Ando | G01S 7/03 342/70 |
| 2011/0196568 | A1 * | 8/2011 | Nickolaou | B60W 30/0953 701/31.4 |
| 2011/0234448 | A1 * | 9/2011 | Hayase | G01S 13/18 342/70 |
| 2012/0150386 | A1 * | 6/2012 | Armbrust | G01S 7/4026 701/36 |
| 2013/0099943 | A1 * | 4/2013 | Subramanya | G01S 7/2926 340/933 |

(Continued)

*Primary Examiner* — Peter M Bythrow
(74) *Attorney, Agent, or Firm* — Dority & Manning, PA (57) ABSTRACT

A vehicle control system includes a set of radars, with each radar of the set including a depth setting which controls a corresponding range of the radar. The corresponding range of at least one radar may be adjusted based on contextual information, as determined by the vehicle when the vehicle is in use.

19 Claims, 4 Drawing Sheets

(56) References Cited

U.S. PATENT DOCUMENTS

| | | | | |
|---|---|---|---|---|
| 2014/0191895 A1* | 7/2014 | Binzer | ................. | G01S 13/878 342/59 |
| 2016/0003938 A1* | 1/2016 | Gazit | ..................... | G01S 13/02 342/81 |
| 2016/0368445 A1* | 12/2016 | Foltin | ................. | B60R 21/0134 |
| 2017/0131722 A1* | 5/2017 | Hiramatsu | ........... | A01B 69/008 |

* cited by examiner

DYNAMIC RANGE SETTING FOR VEHICULAR RADARS

RELATED APPLICATIONS

This application claims benefit of priority to Provisional U.S. Patent Application No. 62/304,131, filed Mar. 4, 2016; the aforementioned priority application being hereby incorporated by reference in its entirety.

BACKGROUND

Vehicles currently employ radar as a sensor for enabling proximity and collision detection. As general rules, to increase maximum detection range (R), automotive radar needs a larger signal to noise ratio (SNR). To increase SNR, radar can increase illumination time or decrease the field of view required to illuminate. Under many conventional approaches, vehicles generally use radars with static range settings.

DETAILED DESCRIPTION

Examples provide for a vehicle with radar that is dynamically configurable for operational depth range. More specifically, a vehicle may include a set of radars, with each radar of the set including a depth setting which controls a corresponding range of the radar when it is in use on the vehicle. The vehicle may determined, or otherwise obtain contextual information from any one of multiple possible sources as the vehicle progresses over a road segment. A vehicle control system may adjust the corresponding range of at least one radar based on the contextual information.

One or more embodiments described herein provide that methods, techniques, and actions performed by a computing device are performed programmatically, or as a computer-implemented method. Programmatically, as used herein, means through the use of code or computer-executable instructions. These instructions can be stored in one or more memory resources of the computing device. A programmatically performed step may or may not be automatic.

One or more embodiments described herein can be implemented using programmatic modules, engines, or components. A programmatic module, engine, or component can include a program, a sub-routine, a portion of a program, or a software component or a hardware component capable of performing one or more stated tasks or functions. As used herein, a module or component can exist on a hardware component independently of other modules or components. Alternatively, a module or component can be a shared element or process of other modules, programs or machines.

Numerous examples are referenced herein in context of an autonomous vehicle. An autonomous vehicle refers to any vehicle which is operated in a state of automation with respect to at least one of steering, propulsion or braking. Different levels of autonomy may exist with respect to autonomous vehicles. For example, some vehicles today enable automation in limited scenarios, such as on highways, provided that drivers are present in the vehicle. More advanced autonomous vehicles drive without any human driver inside the vehicle. Such vehicles often are required to make advance determinations regarding how the vehicle is maneuver given challenging surroundings of the vehicle environment.

Figure 1A:
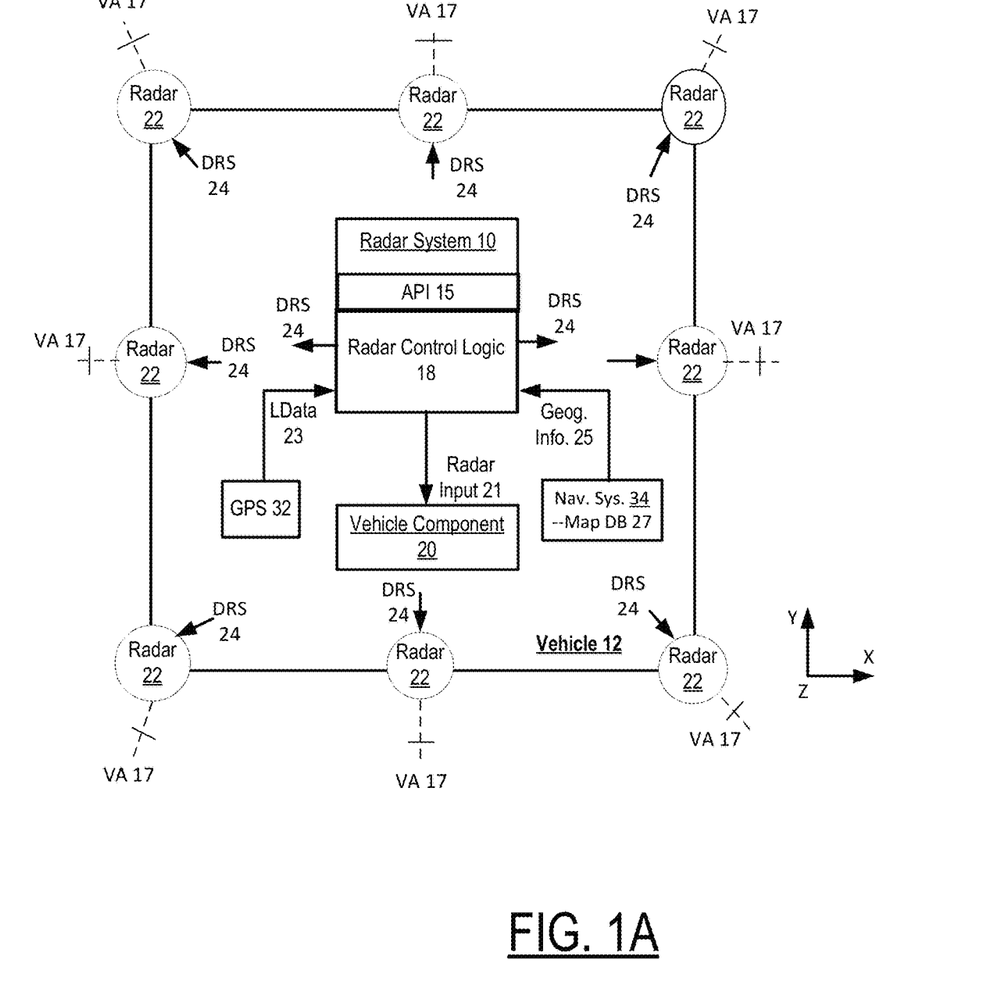
FIG. 1A illustrates an example of a radar system for a vehicle.

FIG. 1A illustrates an example of a radar control system for a vehicle. In an example of FIG. 1A, a vehicle 12 can be either autonomous or non-autonomous, and can include a radar system 10 that includes radar control logic 18 for controlling a set of radars 22. The radar system 10 can be provided for a variety of uses, depending on design and implementation. In an example, the radar system 10 interfaces with one or more components 20 of the vehicle 12 in order to perform functions such as signal driver alerts as to possible hazards or dangers. In variations such as described with FIG. 1B, the radar system 10 can be integrated with a fully or partially autonomous vehicle. In the context of such vehicles, the radar system 10 can be used to implement evasive actions, generate external alerts, monitor approaching roadways, and perform other functions.

The set of radars 22 for the radar system 10 may be distributed at pre-selected locations of the vehicle 12. Each of the radars 22 can include a radar transmitter/receiver, from which an outward radar signal is generated and then subsequently detected on reflection when an object is encountered (e.g., by way of a radar scan). In some examples, each of the individual radars 22 can have a respective orientation (e.g., represented by a viewing angle 17), which can be adjusted about an azimuth (shown by Z axis in FIG. 1A, coming out of the page), while the vehicle 12 moves on the roadway (e.g., along the Y-axis). To further an example of FIG. 1, individual radars 22 present on the vehicle can have their respective viewing angle adjusted between 22.5 and 90 degrees, depending on the intended design or capability of the radar 22. In general, the radars 22 can each operate at one of multiple possible angular orientations within an angular range of viewing angles. At each of the orientations, individual radars 22 of the radar system 10 can operate to generate outwardly directed radar signals, and further to detect incoming signals which result from reflections of the outwardly reflected signals. Under some examples, the radar control logic 18 can include discrete or radar-specific control elements which control progression of radar scans from the particular radar at discrete orientations of the respective angular range.

Additionally, examples recognize that a depth range setting 24 of individual radars 22 can be controlled by a duration in which a given radar 22 is generating radar signals from a particular orientation. More generally, the depth range setting 24 of individual radars 22 can be set by parameters of time (e.g., duration) and energy expended in generating outward radar signals at a particular moment (e.g., when the radar 22 is operated for continuous duration at a given orientation). Thus, radars 22 can be operated for different depth ranges based on the overall energy expended in generating the outward radar signal. Moreover, when individual radars 22 are operated for close range detection, the radar 22 can be moved between orientations of the angular range more quickly, thus providing a better coverage for detecting nearby (or large) objects.

Some conventional approaches dedicate specific radars for long range use and others for short range use, recognizing the benefit of detecting both far and close objects alike. However, such conventional approaches, in which radars 22 are assigned to designations of short or long range, fail to accommodate numerous use cases which vehicles encounter on daily basis, such as, for example, when vehicles approach an intersection or travel on a road that is merging with another road. In contrast, examples provide for radar control logic 18 to selectively determine the depth range setting 24 of one or more of the radars 22 on the vehicle 12, based at least in part on contextual information, and more specifically, by location data 23 and geographic information 25. Once determined, the radar control logic 18 can signal the depth range setting 24 to the respective radars 22. In determining the depth range setting 24, the geographic information 25 can include, for example, information about road segments on which the vehicle is driving on, or is expected to drive on, as the vehicle progresses on a route. The location data 23 can be obtained from, for example, a GPS receiver 32 resident in the vehicle 12, or a mobile computing device carried within the vehicle by a driver or passenger.

According to some examples, the vehicle 12 includes a computer system and human interface for implementing a navigation system 34 utilizing a map database 27. The map database 27 can be local or remote to the vehicle 12. The navigation system 34 can identify geographic information 25 from the map database 27 for use by radar control logic 18. The radar control logic 18 can determine, among other functions, the range depth setting 18 of individual radars 22 based on a specific road segment on which the vehicle 12 travels on, and/or a specific road segment which the vehicle 12 is approaching and will travel on. In some examples, the radar control logic 18 can implement a set of rules from which the depth range setting 24 of individual radars 22 can be determined.

As an addition or variation, the radar control logic 18 can specify the depth range setting 24 of a particular radar 22 at a given angular orientation or subset of angular orientations, separate from alternative depth ranges for other orientations of the same radar 22. For example, one of the radars 22 may be capable of an angular rotation of up to 90°, and the depth range for the particular radar 22 may be set to a maximum for the angular orientation that varies between 0° and 10°, while the depth range of the radar can be minimized at the other angular orientations of the radar. Thus, in instances when the radar performs several scans at different angular orientations, the depth range of the radar 22 may be controlled between a maximum and minimum depth range. In such cases, the progression of the radar 22 through the different angular orientations may vary by duration of time, with those orientations in which longer scans are performed requiring a greater amount of time.

The radar control logic 18 can be implemented in a variety of forms, using hardware, firmware, and/or software. In one example, the radar control logic 18 implements rules based on the road segment that the vehicle 12 approaches or travels on. For example, when the vehicle 12 travels forward on a given road, the default radar depth range settings 24 may specify that a forward-looking radar 22 has a maximum depth range setting 24, and other peripheral or laterally positioned radars 22 have a minimum or intermediate depth range setting 24. When the vehicle 12 approaches a merge lane, the radar control logic 18 can implement a rule that maximizes the depth range setting 24 of peripherally positioned radars 22 so as to enable a greater view of traffic or objects in the approaching merging lane. As another example, the radar control logic 18 implements alternative rules for approaching intersections, where, for example, peripherally positioned radars 22 have their depth range setting 24 maximized to detect approaching traffic in either direction. As still another variation, radar control logic 18 can implement a rule to generate a radar cone that can encompass the depth of an approaching cross-walk, without encroaching on the intersection where cross-traffic may exist. In such an example, the depth range setting of the front facing radar 22 can be maximized to capture the full crosswalk, and the depth range setting 24 can be reduced incrementally as the vehicle approaches the intersection, so that the cross traffic of the intersection does not generate false radar alerts.

According to some examples, the vehicle component 20 receives radar input 21 from the radars 22. The radar input 21 can be processed, either directly (e.g., as raw data) or indirectly (e.g., processed, commands in semantic form, etc.) from the radars 22 or the radar interfaces. For example, additional logic may translate the radar input 21 from either a single radar source, or from a group of the radars 22, into a specific semantic label which identifies an action, command or input parameter. In one example, radar input 21 can be interpreted to detect potential hazards which can impede the vehicles path or cause a collision from a particular direction surrounding. The vehicle component 20 which receives the radar input 21 can correspond to a human interface component that can generate an audible or visual alert of the potential collision or hazard. In variations such as described with FIG. 1B, the radar input 21 can be used for other actions or operations, such as controlling specific autonomous operations of the vehicle. For example, if the radar input 21 indicates a hazard, the vehicle component 20 can implement an evasive action, such as braking, while concurrently generating alarm. Accordingly, in some variations, the radar input 21 can be received by a vehicle component that corresponds to a control system, or component thereof, for an autonomous vehicle.

The nature of radar input 21 can increase with complexity when used with autonomous vehicles. For example, in an autonomous vehicle environment, the radar input 21 can scan traffic in the direction of travel, and then select the lane for the vehicle based on the perceived traffic. Likewise, radar control logic 18 may set peripheral radars of the vehicle to a maximum when performing right turns, or turns into one-way traffic, so as to detect vehicles which a driver or camera may miss.

While an example of FIG. 1A is described in context of functionality provided with a vehicle, variations provide for other device platforms to implement some or all of the steps for dynamically determining the depth range of individual radars 22. In particular, variations provide for functionality to select and set the depth range of individual radars 22 to be implemented by a mobile computing device carried within the vehicle 12, and/or a network service which communicates with the vehicle and/or the mobile computing device. For example, the radar system 10 can include a programmatic interface 15 which is accessible by an application executing on the mobile computing device and/or network service in order to provide depth range settings 24 for individual radars 22 of the radar system 10. In one implementation, the mobile computing device executes a navigation application, and the radar system 10 can interface or execute as part of the navigation application to control the depth range setting 24 of the individual radars 22.

Figure 1B:
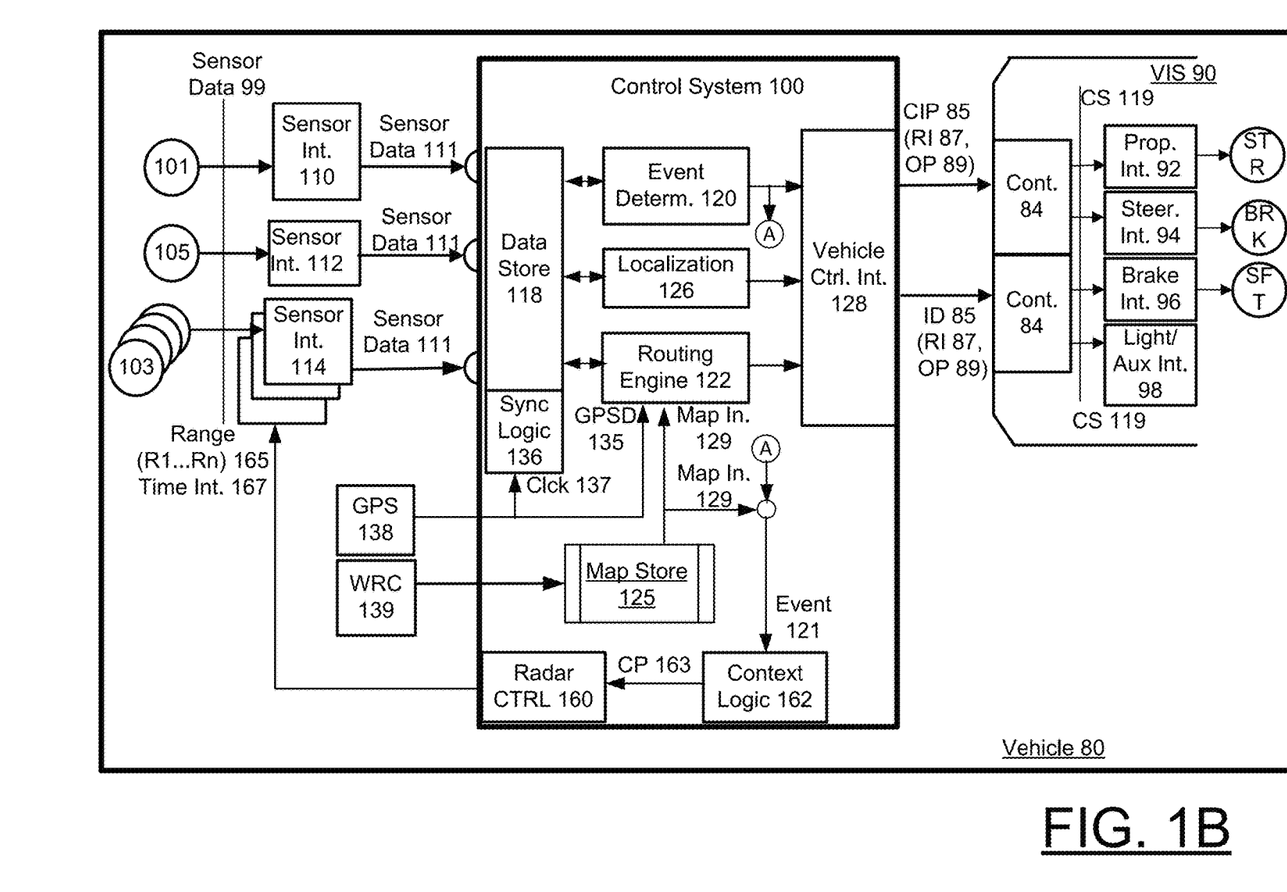
FIG. 1B illustrates an example of a control system for a vehicle that has autonomous capability.

FIG. 1B illustrates an example of a control system for a vehicle that has autonomous capability. In an example of FIG. 1B, a control system 100 is used to autonomously control at least some aspects of the vehicle 80 in a given geographic region. By way of example, the vehicle 80 with autonomous capability can correspond to a human-driven vehicle, having autonomous features for controlling the vehicle for purpose of providing an emergency response to a detected hazard, for other safety related purposes (e.g., incapacitated driver), or at the preference of the driver. In such examples, the level of autonomous control for the vehicle can vary. For example, the autonomous control can be limited to: a specific action (e.g., hard brake), in-lane vehicle adjustments (e.g., accelerating or braking in a given lane), multi-lane autonomous driving without route execution capability (e.g., in-lane adjustments, lane changing), or complete route execution capability. In variations, the vehicle 80 can be autonomous, meaning no human driver may be resident in the vehicle. In examples described, an autonomously driven vehicle can operate without human control. For example, in the context of automobiles, an autonomously driven vehicle can steer, accelerate, shift, brake and operate lighting components. Some variations also recognize that an autonomous-capable vehicle can be operated either autonomously or manually, depending on mode selection.

Accordingly, depending on the capability of the vehicle 80, the control system 100 can operate to process input from a variety of sources, as well as to selectively control one or more facets of the vehicle as the vehicle travels over road segments. The control system 100 can include numerous sensor interfaces for processing sensor input from, for example, a set of radars, as well as other sensors such as cameras (e.g., stereoscopic cameras, short/long range cameras, LiDar, etc.), and sonar. The control system 100 can utilize specific sensor resources in order to intelligently operate the vehicle 80 in most common driving situations. For example, the control system 100 can operate the vehicle 80 by autonomously steering, accelerating and/or braking the vehicle 80 as the vehicle progresses to a destination. The control system 100 can perform vehicle control actions (e.g., braking, steering, accelerating) and route planning using sensor information, as well as other inputs (e.g., transmissions from remote or local human operators, network communication from other vehicles, etc.). Still further, in some examples, the vehicle 80 includes one or more interfaces which detect human input, either made directly through the control system 100 or through control features of the vehicle (e.g., steering wheel, gas pedal, etc.).

In an example of FIG. 1B, the control system 100 includes a computer or processing system which operates to process sensor data that is obtained on the vehicle with respect to a road segment that the vehicle is about to drive on. The sensor data can be used to determine actions which are to be performed by the vehicle 80 in order for the vehicle to continue on a route to a destination. In some variations, the control system 100 can include other functionality, including a GPS receiver 138 and a wireless receiver 139. The wireless receiver 138 can be used to send and/or receive wireless communications with one or more remote sources. In controlling the vehicle, the control system 100 can issue instructions and data, shown as commands 85, which programmatically controls various electromechanical interfaces of the vehicle 80. The commands 85 can serve to control some or all of the operational aspects of the vehicle 80, including propulsion, braking, steering, and auxiliary behavior (e.g., turning lights on). With respect to a specific example of FIG. 1B, the autonomous vehicle 80 can be equipped with one or more types of sensors 101, 103, 105, which combine to provide a computerized perception of the space and environment surrounding the vehicle 80. Likewise, the control system 100 can operate within the autonomous vehicle 80 to receive sensor data from the collection of sensors 101, 103, 105, and to control various electromechanical interfaces for operating the vehicle on roadways.

In more detail, the sensors 101, 103, 105 operate to collectively obtain a sensor view of the area surrounding the vehicle 80 (e.g., 360-degree view). By way of example, the sensors 101, 103, 105 enable the vehicle 80 to obtain information about what is near the sides and/or rear of the vehicle, as well as what is both near and far from the front of the vehicle 80 as the vehicle travels. By way of example, the sensors 101, 103, 105 include multiple sets of cameras sensors 101 (video camera, stereoscopic pairs of cameras or depth perception cameras, long range cameras), radar 103, sonar and/or LiDar sensors.

Each of the sensors 101, 103, 105 can communicate with, or utilize a corresponding sensor interface 110, 112, 114. Each of the sensor interfaces 110, 112, 114 can include, for example, hardware and/or other logical component which is coupled or otherwise provided with the respective sensor. For example, the sensors 101 can include a video camera and/or stereoscopic camera set which continually generates image data of an environment of the vehicle 80. The sensor interface 110 may include a dedicated processing resource, such as provided with a field programmable gate array ("FPGA") which receives and/or processes raw image data from the camera sensor. Likewise, radars 103 can provide an additional or alternative sensor set. As described with other examples, the radars 103 can be dynamically configurable to determine their respective depth setting based on contextual information determined from the vehicle in motion. The radar interface 112 can reside or operate with individual radars 103, and/or provide a centralized controller for multiple radars 103 connected by a data bus. The interfaces 110, 112, 114 can pre-process the raw sensor data and/or perform more complex processing. With respect to radars 103, the interface(s) 112 can receive the depth settings and implement the configurations on the corresponding radars 103.

According to one implementation, the vehicle interface subsystem 90 can include or control multiple interfaces to control mechanisms of the vehicle 80. By way of example, the vehicle interface subsystem 90 can include a propulsion interface 92 to electrically (or through programming) control a propulsion component (e.g., a gas pedal), a steering interface 94 for a steering mechanism, a braking interface 96 for a braking component, and lighting/auxiliary interface 98 for exterior lights of the vehicle. The vehicle interface subsystem 90 and/or control system 100 can include one or more controllers 84 which receive one or more commands 85 from the control system 100. The commands 85 can include route information 87 and one or more operational parameters 89 which specify an operational state of the vehicle (e.g., desired speed and pose, acceleration, etc.).

The controller(s) 84 generate control signals 119 in response to receiving the commands 85 for one or more of the vehicle interfaces 92, 94, 96, 98. The controllers 84 use the commands 85 as input to control propulsion, steering, braking and/or other vehicle behavior while the autonomous vehicle 80 follows a route. Thus, while the vehicle 80 may follow a route, the controller(s) 84 can continuously adjust and alter the movement of the vehicle in response receiving a corresponding set of commands 85 from the control system 100. Absent events or conditions which affect the confidence of the vehicle in safely progressing on the route, the control system 100 can generate additional commands 85 from which the controller(s) 84 can generate various vehicle control signals 119 for the different interfaces of the vehicle interface subsystem 90.

According to examples, the commands 85 can specify actions that are to be performed by the vehicle 80. The actions can correlate to one or multiple vehicle control mechanisms (e.g., steering mechanism, brakes, etc.). The commands 85 can specify the actions, along with attributes such as magnitude, duration, directionality or other operational characteristic of the vehicle 80. By way of example, the commands 85 generated from the control system 100 can specify a relative location of a road segment which the autonomous vehicle 80 is to occupy while in motion (e.g., change lanes, move to center divider or towards shoulder, turn vehicle etc.). As other examples, the commands 85 can specify a speed, a change in acceleration (or deceleration) from braking or accelerating, a turning action, or a state change of exterior lighting or other components. The controllers 84 translate the commands 85 into control signals 119 for a corresponding interface of the vehicle interface subsystem 90. The control signals 119 can take the form of electrical signals which correlate to the specified vehicle action by virtue of electrical characteristics that have attributes for magnitude, duration, frequency or pulse, or other electrical characteristics.

According to some examples, the vehicle 80 includes multiple radars 103, and the control system 100 includes a radar control logic 160 to control and utilize the radars 103 of the vehicle 80. The multiple radars 103 can be distributed on the vehicle 80 in accordance with a predetermined configuration. For example, a set of four or six radars 103 can be positioned at various locations of the vehicle in order to provide capability for 360-degree radar visibility. The control system 100 can include functionality that determines dynamically, based on context, the depth range of at least some of the radars 22.

In an example of FIG. 1B, the control system 100 includes an event determination logic 120, routing engine 122, localization component 126 and vehicle control interface 128. The event determination logic 120 and the routing engine 122 combine to generate inputs which the vehicle control interface 128 maps into commands 85 for controlling the operation of the vehicle 80. In an example in which the vehicle 80 is autonomous, the routing engine 122 may receive, for example, a destination input from a user or external source. The routing engine 122 may also receive GPS data 135 from a GPS receiver 138. The routing engine 122 may then interface with a map store 125 to determine the route 161 for the vehicle 80, which can then be signaled to the vehicle control interface 128. In turn, the vehicle control interface 128 may execute turns, brakes, accelerations and other actions to implement the selected route.

The control system 100 can include a data store 118 which maintains the various types of incoming sensor data, for use with the various logical components of the control system 100. The data store 118 can be provided with logic that structures and normalizes incoming data from different sources, so that the incoming data has a common format and structure. Additionally, synchronization logic 136 can be provided with the control system 100 to enable data packets, representing sensor values measured at the various sensors 101, 103, 105 to be synchronized in accordance with a common clock signal 137. For example, control system 100 may utilize the clock signal 137 from GPS receiver 138 in order to generate the reference clock signal 137 for synchronizing sensor data 111 from the various sensor data sources.

According to some examples, the event determination logic 120 processes uses synchronized sensor data from the data store 118 to detect route disruptions, potential hazards or obstructions, and other events. The event determination logic 120 may thus illustrate a simplified representation of one or multiple models or logical entities which can process the sensor inputs in order to perceive information about events which that will or will likely interfere with the vehicle's progress or safety. By way of example, the event determination logic 120 processes one or multiple types of image input, radar input, and/or sonar input in order to generate event input 121 for the vehicle control interface 128. The event input 121 can, for example, signal the vehicle control interface 128 to generate commands 85 which cause the vehicle 80 to perform any one or more of: (i) progress without change, (ii) slow down, (iii) brake suddenly, (iv) swerve or take evasive action, or (v) perform alternative actions (e.g., lane signaling, sounding horn, etc.). The event determination logic 120 can generate the event input 121 in response to, for example, detecting (i) another object in the path of the vehicle, (ii) detecting traffic signals, (iii) detecting road segments (e.g., intersections) and/or various other objects. Separate models may be used for detecting objects of different types, using sensor data 111 of different kinds. For example, the event determination logic 120 may use sensor input 111 from a combination of radar 103 and one or more types of images in order to spot hazards in a current or projected path of the vehicle 80. Will The localization component 126 can use sensor data from the data store 118 in order to determine the precise location (e.g., within a foot, 3-4 inches, etc.) and pose of the vehicle at a given road segment. Thus, the localization component 126 can detect a specific lane the vehicle is traveling in, whether the vehicle is in the middle of a lane change, and/or an orientation of the vehicle with respect to the road segment.

Components such as event determination 120 and localization 126 can utilize multiple types of sensor data 111. For example, the event determination logic 120 can use image data, including three dimensional or stereoscopic images captured of a scene surrounding or in front of the vehicle, LiDar images, and/or video, for purpose of detecting a possible obstruction, and determining what action should be taken by the vehicle (if any) based on the classification and relative location of the object. In such context, the event determination logic 120 can utilize radar as an early detection system for focusing one or more cameras of the vehicle 80. When radar input detects a potential obstruction, the event determination logic 120 can signal the vehicle control interface 128 to slow down initially (e.g., command to stop accelerating and or light braking), thus providing the image recognition processes more time to identify the potential obstruction. The vehicle control interface 128 can then determine the action that is to be performed to avoid collision based on or more defined image processing.

Likewise, the locality determination component 126 can use image data such as provided by LiDar and/or stereoscopic cameras, in order to obtain, for example, image pointlets which can identify the pose and location of the vehicle 80 on a particular road segment. With highly precise location determination, the vehicle 80 can better understand its surroundings, including identifying those objects which are not static (e.g., landmarks, permanently fixed objects such as buildings and mailboxes). Moreover, with highly precise positioning and pose, the vehicle 80 can utilize map data 129 which carries multiple layers of additional contextual information, separate from the road network description provided by conventional maps. In one example, the control system 100 stores a map store 125, comprising map data 129 which identifies specific characteristics of the road segment on which the vehicle 80 is traveling. Additionally, the map store 125 can identify static objects, such as landmarks, signages, buildings of the surroundings, and other objects.

While examples provided with FIG. 1B illustrate numerous facets of the vehicle 80 which can be controlled via the control system 100, variations to examples described can provide for human driven vehicles, or hybrid combinations, in which the control system 100 has more limited ability to control the operation of the vehicle 80.

According to some examples, the control system 100 includes radar control logic 160 and context determination component 162. The context determination component 162 can parse sensor data, output of logical components, and/or various other datasets in order to determine contextual parameters 163. The contextual parameters 163 can identify, for a given interval of time, a radar range for different points of an overall radar view which is available for the vehicle, given physical positioning and orientation of individual radars 103 on the vehicle 80. For example, for cases where the radars 103 combined to provide a 360° radar view of the vehicle, the contextual parameters 163 can specify specific death ranges at angular increments of the total radar view.

The radar control logic 160 can utilize the contextual parameters 163 in order to dynamically configure the radars 103 of the vehicle 80. Specifically, the radar control logic 160 can identify the depth range setting 165 for each radar 103 of the vehicle. In variations, the radar control logic 160 can also specify the time interval 167 for when the specified depth ranges are to be in place. In variations, the radar control logic 160 can sub-configure individual radars 103 to have different depth ranges when the individual radars 103 are at a given orientation in their respective angular range of operation.

According to some examples, the context determination component 162 determines contextual information in the form of map data 129 identifying an upcoming road segment on which the vehicle 80 is to traverse. As shown with an example of FIG. 3, the map data 129 can identify road network conditions such as a merging lane. The context determination component 162 can determine from the map data 129, contextual parameters 163 in the form which include depth range at different available viewing angles of the radars 103. Thus, for example, the depth range of radars 103 which are oriented in the direction of a merging lane can be increased to view potential hazards or objects in a merging lane. The contextual parameters 163 can also include a time interval, corresponding to when the vehicle will need to view the long-range radar information. Thus, the time interval can correspond to a duration that initiates at some point in the future (e.g., 1-2 second in the future). In this way, the map data 129 enables planning operations to optimize the functioning of the radars 103, as the immediate path of the vehicle 80 is determined from the known route for the given trip and the road segment of the vehicle's travel, as provided from the map store 125.

In other variations, context determination component 162 can receive contextual information from logical components such as localization 126 and/or event determination logic 120. The localization component 126 can, for example, enable a more granular use of map data 129, such as to identify, for example, driveways that can hide approaching vehicles, or areas in the upcoming road segment which are occluded but possible inlets of obstruction for cars, pedestrians, bicycles or other objects. The event determination logic 120 can also provide contextual information in the form of a detected (and potential) interference or hazard. For example, the event determination logic 120 can identify a potentially stalled vehicle in a given lane adjacent to that which the vehicle is using, and the context determination component 162 can parse the event input 121 or alert for purpose of utilizing long-range radar to identify the relative direction of the detected hazard. The long-range radar may then enable the control system 100 to better understand the potential safety risk of the stalled vehicle (e.g., such as whether a person is near the stalled vehicle). In each of the examples provided, the context determination logic 162 can determine contextual parameters 163 which identify a desired depth range for the vehicles radar 103 at a particular angle or orientation.

Among other benefits, examples as described enable the radars 103 to be maintained at a default setting, such as at a low-power setting which enable proximity detection, while selectively using long-range radar capabilities based on detected contextual information (e.g., upcoming road segment, potential hazard or obstruction, hidden driveway, etc.). The selective and dynamic configuration of radars 103 for long-range detection can save power, while optimizing the detectability provided by the radars 103 for need.

Figure 2:
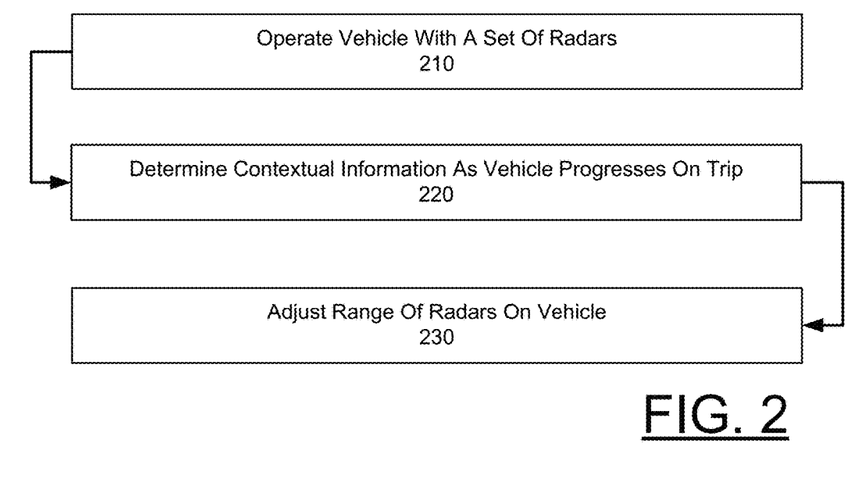
FIG. 2 illustrates an example method for operating a vehicle to determine a depth range of one or more radars on the vehicle.

FIG. 2 illustrates an example method for operating a vehicle to determine a depth range of one or more radars on the vehicle. An example such as provided by FIG. 2 may be implemented by vehicles and/or control system such as described with examples of FIG. 1A and FIG. 1B. Accordingly, reference may be made to elements or components described with other figures for purpose of illustrating a suitable component for performing a step or sub-step being described.

With reference to FIG. 2, a vehicle may be operated with a set of radars (210). Each radar in the set can include a depth setting which controls a corresponding range of the radar. Depending on variations and implementation, the vehicle can be human driven, autonomous and without human driver, or partially autonomous.

Contextual information can be determined about a trip of the vehicle as the vehicle progresses over a given road segment (220). By way of example, the contextual information can include identification of specific types of road segments (e.g., merge lanes, intersections, crosswalks, hidden driveways, etc.). To contextual information can be determined from map data, such as provided on vehicles for purpose of navigation, or as used in some autonomous vehicles for localization determination and other functions. In variations, the contextual information can reflect autonomous identification of potential objects of obstruction or hazard, such as determined from analyzing image and/or radar sensor data. Still further, contextual information can reflect the amount of traffic that is present on the road the vehicle is traveling on, as well as the time of day, the day of week or calendar day, the weather, and various other types of information.

Based on the contextual information, the vehicle (or vehicle control system) can adjust the corresponding range of one or more radars on the vehicle (230). For example, at least one radar may capture a long-range radar view of a relevant road segment for the vehicle. As described with other examples, the long-range radar can provide purpose such as early detection of road hazards.

Figure 3:
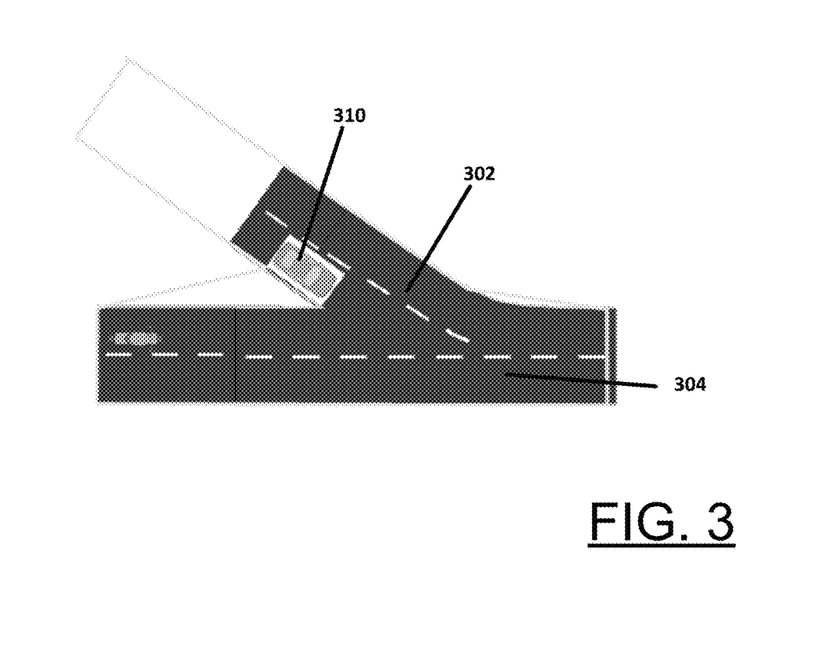
FIG. 3 illustrates an example vehicle equipped with a radar system that dynamically configures individual radars of the vehicle to have varying depth ranges.

FIG. 3 illustrates an example vehicle equipped with a radar control system that dynamically configures individual radars of the vehicle to have varying depth ranges. The vehicle 310 can travel on the road segment 302, and use map information (e.g., for navigational purposes) to detect an upcoming merge lane 304. In anticipation of the merge lane, the vehicle 310 can change the depth range of one or multiple radars on the passenger side of the vehicle to better detect potential vehicles or other objects which can potentially collide with the vehicle when the lane merger occurs. As described with other examples, parameters for configuring individual radars can specify, for example, the angle of coverage, and/or the desired depth. In some variations, the parameters can also specify an interval of time (e.g., start time, duration, end time) when the increase in the radar depth range is to be made present.

Hardware Diagrams

Figure 4:
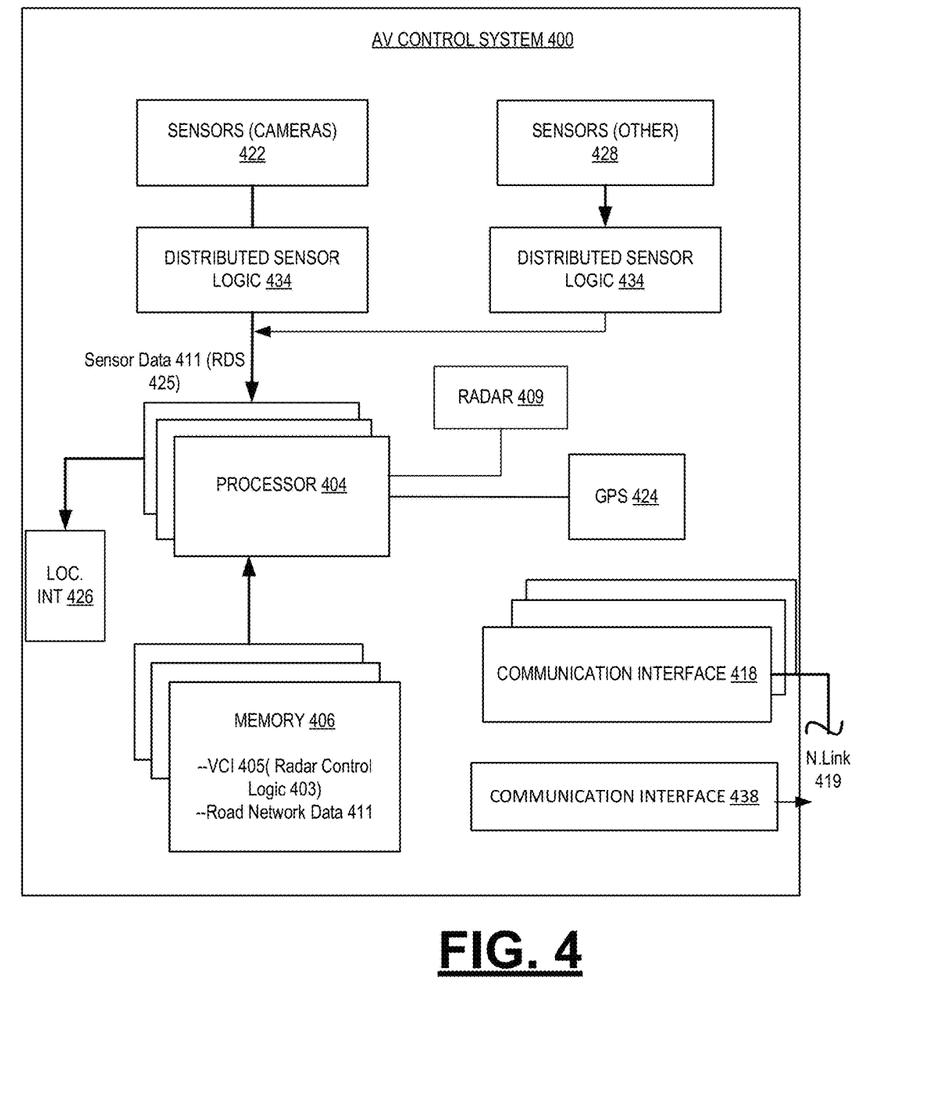
FIG. 4 is a block diagram that illustrates a control system for a vehicle upon which embodiments described herein may be implemented.

FIG. 4 is a block diagram that illustrates a control system for a vehicle upon which embodiments described herein may be implemented. A vehicle control system 400 can be implemented using a set of processors 404, memory resources 406, multiple sensors interfaces 422, 428 (or interfaces for sensors) and location-aware hardware such as shown by GPS 424.

According to some examples, the control system 400 may be implemented within a vehicle with software and hardware resources such as described with examples of FIG. 1A, FIG. 1B and FIG. 2. In an example shown, the control system 400 can be distributed spatially into various regions of a vehicle. For example, a processor bank 404 with accompanying memory resources 406 can be provided in a vehicle trunk. The various processing resources of the control system 400 can also include distributed sensor processing components 434, which can be implemented using microprocessors or integrated circuits. In some examples, the distributed sensor logic 434 can be implemented using field-programmable gate arrays (FPGA).

In an example of FIG. 4, the control system 400 further includes multiple communication interfaces, including one or more multiple real-time communication interface 418 and asynchronous communication interface 438. The various communication interfaces 418, 438 can send and receive communications to other vehicles, central services, human assistance operators, or other remote entities for a variety of purposes. In the context of FIG. 1A and FIG. 1B, control system 100 can be implemented using the vehicle control system 400, such as shown with an example of FIG. 4. In one implementation, the real-time communication interface 418 can be optimized to communicate information instantly, in real-time to remote entities (e.g., human assistance operators). Accordingly, the real-time communication interface 418 can include hardware to enable multiple communication links, as well as logic to enable priority selection.

The vehicle control system 400 can also include a local communication interface 426 (or series of local links) to vehicle interfaces and other resources of the vehicle. In one implementation, the local communication interface 426 provides a data bus or other local link to electro-mechanical interfaces of the vehicle, such as used to operate steering, acceleration and braking, as well as to data resources of the vehicle (e.g., vehicle processor, OBD memory, etc.).

The memory resources 406 can include, for example, main memory, a read-only memory (ROM), storage device, and cache resources. The main memory of memory resources 406 can include random access memory (RAM) or other dynamic storage device, for storing information and instructions which are executable by the processors 404.

The processors 404 can execute instructions for processing information stored with the main memory of the memory resources 406. The main memory can also store temporary variables or other intermediate information which can be used during execution of instructions by one or more of the processors 404. The memory resources 406 can also include ROM or other static storage device for storing static information and instructions for one or more of the processors 404. The memory resources 406 can also include other forms of memory devices and components, such as a magnetic disk or optical disk, for purpose of storing information and instructions for use by one or more of the processors 404.

One or more of the communication interfaces 418 can enable the autonomous vehicle to communicate with one or more networks (e.g., cellular network) through use of a network link 419, which can be wireless or wired. The control system 400 can establish and use multiple network links 419 at the same time. Using the network link 419, the control system 400 can communicate with one or more remote entities, such as network services or human operators. According to some examples, the control system 400 stores vehicle control instructions 405, which include radar control logic 403. In some implementations, other instructions can be stored for implementing other logical components as described.

In operating the autonomous vehicle, the one or more processors 404 can access data from a road network data set 411 in order to determine a route, immediate path forward, and information about a road segment that is to be traversed by the vehicle. The road network data set 411 can be stored in the memory 406 of the vehicle and/or received responsively from an external source using one of the communication interfaces 418, 438. For example, the memory 406 can store a database of roadway information for future use, and the asynchronous communication interface 438 can repeatedly receive data to update the database (e.g., after another vehicle does a run through a road segment).

According to some examples, one or more of the processors 404 execute the vehicle control instructions 405 to process sensor data 421 obtained from the sensor interfaces 422, 428 for a road segment on which the autonomous vehicle is being driven. The one or more processors 404 analyze the sensor data 421 to determine, for example, radar depth settings 425 for radars 409 which are resident on the vehicle.

It is contemplated for embodiments described herein to extend to individual elements and concepts described herein, independently of other concepts, ideas or system, as well as for embodiments to include combinations of elements recited anywhere in this application. Although embodiments are described in detail herein with reference to the accompanying drawings, it is to be understood that the invention is not limited to those precise embodiments. As such, many modifications and variations will be apparent to practitioners skilled in this art. Accordingly, it is intended that the scope of the invention be defined by the following claims and their equivalents. Furthermore, it is contemplated that a particular feature described either individually or as part of an embodiment can be combined with other individually described features, or parts of other embodiments, even if the other features and embodiments make no mentioned of the particular feature. Thus, the absence of describing combinations should not preclude the inventor from claiming rights to such combinations.

What is claimed is:

1. A method for operating an autonomous vehicle, the method comprising:
   operating, by a computing system comprising one or more computing devices, a set of radars on the autonomous vehicle, each radar in the set of radars including a depth setting which controls a corresponding range of the radar from the autonomous vehicle;
   determining, by the computing system, contextual information about a trip of the autonomous vehicle as the autonomous vehicle progresses over a first road segment, the contextual information comprising information about a second road segment that intersects the first road segment and that the autonomous vehicle is approaching, the information identifying a type of the second road segment and identifying a likely point of ingress of an object into a path of the autonomous vehicle from the second road segment; and
   adjusting, by the computing system, the corresponding range of at least one radar in the set of radars based on the contextual information to detect a location of the object relative to the autonomous vehicle.

2. The method of claim 1, further comprising:
   making a selection of the at least one radar based on the contextual information.

3. The method of claim 1, wherein the at least one radar is moved over an angular range that includes multiple viewing orientations, and wherein adjusting the corresponding range of at least one radar includes selecting a viewing orientation from the multiple viewing orientations, and selecting the range of the radar at the selected viewing orientation.

4. The method of claim 3, wherein adjusting the corresponding range includes determining a duration in which the selected radar is actively signaling and monitoring when in the selected viewing orientation.

5. The method of claim 1, wherein the information about the second road segment includes information that identifies at least one of a traffic light, road signage, or a cross walk.

6. The method of claim 1, wherein the information about the second road segment includes information that identifies a set of static objects which surround the second road segment.

7. The method of claim 1, wherein the contextual information includes one or more of a time of day, a day of week or calendar day, or an amount of traffic.

8. The method of claim 1, further comprising:
   autonomously controlling the autonomous vehicle based on information received from the set of radars.

9. The method of claim 1, wherein adjusting the corresponding range includes selecting any one of the radars in the set for adjustment in range.

10. A control system for an autonomous vehicle, comprising:
    a set of processors;
    memory to store instructions;
    a plurality of interfaces for sensors of the autonomous vehicle, the plurality of interfaces including a set of radar interfaces;
    wherein the set of processors execute instructions that include:
        determine contextual information about a trip of the autonomous vehicle as the autonomous vehicle progresses over a first road segment, the contextual information comprising information about a second road segment that intersects the first road segment and that the autonomous vehicle is approaching, the information identifying a type of the second road segment and identifying a likely point of ingress of an object into a path of the autonomous vehicle from the second road segment; and
        adjust the corresponding range of at least one radar in the set of radars based on the contextual information including the information identifying the type of the second road segment to detect a location of the object relative to the autonomous vehicle.

11. The control system of claim 10, wherein the memory stores a map that identifies road segments, including the second road segment, and wherein the one or more processors determine the contextual information using the map.

12. The control system of claim 11, wherein the one or more processors identify, from the map, a set of static objects, and wherein contextual information includes information determined from the set of static objects.

13. An autonomous vehicle comprising:
    a control system;
    a set of radars;
    a memory to store instructions and a map;
    one or more processors which execute the instructions to:
        access the map;
        determine contextual information from the map, the contextual information comprising information comprising information about a second road segment that intersects a first road segment on which the autonomous vehicle is traveling, the contextual information identifying a type of the second road segment and identifying a likely point of ingress of an object into a path of the autonomous vehicle from the second road segment; and
        adjust a range of each radar in the set of radars based on the determined contextual information including the information identifying the type of the second road segment to detect a location of the object relative to the autonomous vehicle.

14. The autonomous vehicle of claim 13, wherein the one or more processors make a selection of the at least one radar based on the contextual information.

15. The autonomous vehicle of claim 13, wherein the at least one radar is moved over an angular range that includes multiple viewing orientations, and wherein the one or more processors adjust the corresponding range of at least one radar by selecting a viewing orientation from the multiple viewing orientations, and by selecting the range of the radar at the selected viewing orientation.

16. The autonomous vehicle of claim 15, wherein the one or more processors adjust the corresponding range by determining a duration in which the selected radar is actively signaling and monitoring when in the selected viewing orientation.

17. The autonomous vehicle of claim 13, wherein the contextual information includes one or more of a time of day, a day of week or calendar day, or an amount of traffic.

18. The autonomous vehicle of claim 13, wherein the information identifying the type of the second road segment comprises information identifying the second road segment as at least one of a merge lane, an intersection, a crosswalk, or a hidden driveway.

19. The method of claim 1, wherein the information identifying the type of the second road segment comprises information identifying the second road segment as at least one of a merge lane, an intersection, a crosswalk, or a hidden driveway.

* * * * *